(12) United States Patent
Haring et al.

(10) Patent No.: US 8,030,414 B2
(45) Date of Patent: Oct. 4, 2011

(54) OLIGOMERS AND POLYMERS CONTAINING SULFINATE GROUPS AND METHOD FOR THE PRODUCTION THEREOF

(76) Inventors: Thomas Haring, Stuttgart (DE); Jochen Kerres, Ostfildern (DE); Wei Zhang, Stuttgart (DE)

(*) Notice: Subject to any disclaimer, the term of this patent is extended or adjusted under 35 U.S.C. 154(b) by 0 days.

(21) Appl. No.: 12/324,320

(22) Filed: Nov. 26, 2008

(65) Prior Publication Data

US 2009/0221759 A1    Sep. 3, 2009

Related U.S. Application Data

(63) Continuation of application No. 11/602,481, filed on Nov. 20, 2006, now abandoned, which is a continuation of application No. 10/488,420, filed as application No. PCT/DE02/03260 on Sep. 2, 2002, now Pat. No. 7,202,327.

(30) Foreign Application Priority Data

Sep. 1, 2001  (DE) .................................. 101 42 573
Feb. 28, 2002 (DE) .................................. 102 09 784

(51) Int. Cl.
   C08F 8/00      (2006.01)
   C08F 14/00     (2006.01)
   C08F 114/00    (2006.01)
   C08F 214/00    (2006.01)

(52) U.S. Cl. .................. 525/330.9; 525/319; 525/327.5; 525/331.2; 525/331.8; 525/340; 525/343; 525/348; 525/359.1; 525/359.2; 525/359.3; 525/375; 525/385; 525/535

(58) Field of Classification Search .................. 525/319, 525/327.5, 340, 343, 348, 359.1, 359.2, 359.3, 525/375, 385, 535, 330.9, 331.2, 331.8
See application file for complete search history.

(56) References Cited

U.S. PATENT DOCUMENTS 7,288,599 B2 * 10/2007 Kerres et al. .................. 525/319

* cited by examiner

*Primary Examiner* — Duc Truong
(74) *Attorney, Agent, or Firm* — Hayes and Boone, LLP (57) ABSTRACT

The invention relates to novel polymers or oligomers containing at least sulfinate groups (P—$(SO_2)_n$X, X=1-(n=1), 2-(n=2) or 3-(n=3) valent metal cation or H+ or ammonium ion $NR_4+$ where R=alkyl, aryl, H), which are obtained by completely or partially reducing polymers or oligomers containing at least $SO_2$Y-groups (Y=F, Cl, Br, I, OR, $NR_2$ (R=alkyl and/or aryl and/or H), N-imidazolyl, N-pyrazolyl) by means of suitable reducing agents in a suspension or in a solution form.
Polymer and polymer(blend)membranes which are obtained by further reacting the received sulfinated polymers, especially by alkylation of the sulfinate groups with mono- di- or oligo functional electrophiles. The invention further relates to methods for producing the sulfinated polymers and for further reacting the sulfinated polymers with electrophiles by S-alkylation.

4 Claims, 8 Drawing Sheets

OLIGOMERS AND POLYMERS CONTAINING SULFINATE GROUPS AND METHOD FOR THE PRODUCTION THEREOF

This application is a CON of Ser. No. 11/602,481 filed Nov. 20, 2006 now ABN which is a CON of Ser. No. 10/488,420 filed Jul. 22, 2004 now U.S. Pat. No. 7,202,327 which is a 371 of PCT/DE 2002/003260 FILED Sep. 2, 2002.

It is known from the literature that in polymers containing sulfinate groups SO2Li the sulfinate groups can be cross-linked by di- or oligohalogenoalkanes with alkylation of the sulfinate group to the sulfone group[1]. This crosslinking method can be used to cross-link ionomer membranes in order to reduce the membrane swelling which leads to a better mechanical and thermal stability of the membranes in the respective membrane process (for example electrodialysis, diffusion dialysis, membrane fuel cells (hydrogen membrane fuel cells, direct methanol fuel cells)). One can produce two different types of in such a way cross-linked ionomer membranes:

[1]"Vernetzung von modifizierten Engineering Thermoplasten" J. Kerres, W. Cui, W. Schnumberger: Deutsches Patent 196 22 337.7 (Anmeldung vom 4 Jun. 1996), Deutsches Patentarnt (1997) "Reticulation de Materiaux Thermoplastiques Industriels Modifies" J. Kerres, W. Cui, W. Schnumberger: Französisches Patent F 97 06706 vom 30 Apr. 1997 "Cross-Linking of Modified Engineering Thermoplastics" J. Kerres, W. Cui, W. Schnumberger: U.S. Pat. No. 6,221,923; erteilt am 24 Apr. 2001

1) The sulfonated polymer is dissolved together with the sulfinated polymer in a suitable, often dipolar aprotic solvent and a dihalogeno cross-linker or oligohalogeno cross-linker if necessary is added, for example 1,4-diiodobutane. During the solvent evaporation the cross-linking reaction takes place[2].

[2] "Development and Characterization of Crosslinked Ionomer Membranes Based Upon Sulfinated and Sulfonated PSU. 2. Crosslinked PSU Blend Membranes By Alkylation of Sulfinate Groups With Dihalogenoalkanes." Jochen Kerres, Wei Cui, Martin Junginger J. Memb. Sci. 139, 227-241 (1998)

2) A polymer, which contains both sulfonate and sulfonate group (produced by partial oxidation, for example, of the polymeric sulfinate with NaOCl, $KMnO_4$, $H_2O_2$ etc.), is dissolved in a suitable dipolar aprotic solvent and a dihalogeno cross-linker or oligo halogeno cross-linker if necessary is added, for example 1,4-diiodobutane. During the solvent evaporation the cross-linking reaction takes place[3]. Up to now however only sulfinated polymers are known from the literature, which are prepared from the reaction of organometallated polymers with Sulphur dioxide (for example lithiated polysulfone from the reaction of polysulfone with butyl- or phenyllithium)[4,5]. However, not every type of polymers can be treated with organometallic reagents since the organometallic reagents react with functional groups of the polymers and are able to destroy the polymers. Organometallic reagents react with the carbonyl group, for example, so that high performance thermoplastics of the polyetherketone family containing the carbonyl group in the main chain for example (Polyetherketone PEK Victrex®, polyetheretherketone PEEK Victrex®, polyetheretherketoneketone PEEKK or polyetherketoneetheretherketone (PEKEKK Ultrapek®)) can not be sulfinated via lithiation. For the introduction of the sulfinate group, another way must be found for these polymers. It would be desirable to have sulfinated polyetherketones, since these polymer could then be cross-linked. The polyetherketones are thermally and mechanically more stable than for example polysulfones or polyphenyleneethers, and therefore cross-linked ionomer membranes from polyetherketone polymers might show better stabilities in (electro) membrane processes.

[3] "New sulfonated engineering polymers via the metalation mute. 2. Sulfinated-Sulfonated Poly(ethersulfone) PSU Udel® and Its Crosslinking." J. Kerres, W. Zhang, W. Cui J. Polym. Sci.: Part A: Polym. Chem. 36, 1441-1448 (1998)

[4] "Aromatic Polysulfone Compounds and their Manufacture" M. D. Guiver, O. Kutowy U.S. Pat. No. 4,999,415 (1991)

[5] "Aromatische Polysulfonderivate und Verfahren zu ihrer Herstellung" M. D. Guiver, O. Kutowy, J. W. ApSimon Patentanmeldung-Offenlegungsschrift DE 36 36 854 A1 (1987)

DETAILED DESCRIPTION

From the literature it is known that low-molecular sulfochlorides can be reduced to sulfinates by reduction with Zn dust, iron dust, sodium sulfite, hydrazine, $H_2S$, $LiAlH_4$, triethylaluminium, ethylaluminium sesquichloride[6,7]. The reduction leads to good yields primarily with Zn dust[8] and with $LiAlH_4$[9]. It was surprisingly found now that polymers, which contain non-ionic sulfonate group derivatives, e.g. the sulfochloride group $SO_2$Cl, (polymeric sulfochlorides are easily accessibly by reaction of the sulfonic acid group with thionyl chloride, phosphorous trichloride oxide, phosphorous pentoxide or by reaction of lithiated polymers with sulfuryl chloride), can be converted with suitable reducing agents or with mixtures of suitable reducing agents in solution or in suspension in high yield and without cross-linking. The sulfochloride group of the respective polymers can be converted to sulfinate group either completely or partially, depending on type and quantity of reducing agent and or other reaction conditions (e.g. concentration, temperature). The fact that no cross-linking of the polymer as a side reaction takes place during the reduction is primarily remarkable and therefore surprising since it is known for example of sulfinic acids that these can react under disproportionation with each other. It was particularly surprising that the reaction of the polymeric sulfochlorides took place with $LiAlH_4$ at temperatures of –20 to –60° C. without cross-linking and with a high yield, since at this reaction lewis acidic intermediates appear, which could catalyse the cross-linking of the formed sulfinate group[9].

[6] "Syntheses of sulfinic adds" Uri Zoller, in "The Chemistry of Sulphinic Adds, Esters and Their Derivatives", ed. by S. Petai, John Wiley and Sons, 1990, New York, S. 187f

[7] "VIII. Reductions of Sulfonyl Derivatives" S. Oae, in "Organic Sulfur Chemistry: Structure and Mechanism", ed. by J. T. Doi, CRC Press, Inc., Boca Raton, 1991, S. 334f

[8] "Sodium p-Toluenesulfinate" F. C. Whitmore, F. H. Hamilton, in "Organic Syntheses", Coll. Vol. I, ed by H. Gilman, 2nd ed., John Wiley and Sons, New York, 1956

[9] "Lithium Aluminium Hydride Reduction of Certain Sulfonic Add Derivatives" L. Field, F. A. Grunwald J. Org. Chem. 16, 946-953 (1951)

It was further surprising that at the reduction of polymeric sulfochlorides with aqueous sodium salt solutions or other sulphurous reducing agents like sodium dithionite, sodium thiosulfate or mixtures of these reducing agents the reaction can be controlled in such a way, that only a part of the sulfochloride groups is converted to sulfinate groups, and the remaining sulfochloride groups remain unchanged (e.g. are not hydrolyzed to the sulfonic acid group). This is of importance when the sulfinate groups of the polymers containing both sulfochloride and sulfinate groups are alkylated by S-alkylation. Examples of alkylations are:

covalent crosslinking with dihalogeno or oligohalogeno compounds or other difunctional or oligofunctional alkylation agents or/and Reaction with monofunctional alkylation agents.

The sulfinate S-alkylation apparently proceeds in a greater yield if sulfochloride groups are available in the polymer instead of ionical sulfonic acid salt derivatives. The reason for this is presumably, that unloaded sulfochloride groups are solvated better than sulfonate salt groups by the solvents, which are used normally for polymers containing sulfinate groups (dipolar aprotic solvents like N-methylpyrolidinone NMP, N,N-dimethylacetamide DMAc, N,N-dimethylformamide DMF, dimethylsulfoxide DMSO or sulfolane). A better solvation leads to a better solubility of both the sulfochlorinated polymer and the sulfinated polymer (ion effect: if the ion concentration and with that the ionic strength of the solution containing the different polymers is smaller, the sulfinated polymer is also dissolved better) and thus to higher reactivity of the polymer (polymers) containing sulfinate groups with the alkylation agents.

With the method of the present invention a large number of polymeric sulfinates according to the invention becomes accessible—actually every polymer or oligomers sulfonic acid can be transferred after transformation into the sulfohalide or another non-ionic sulfonic acid derivative to the respective polymeric or oligomeric sulfinate. Thus particularly sulfinated polymers become accessible, which can not be sulfinated by other methods, such as e.g. polymers containing carbonyl groups in the main chain or in the side chain. Particularly the high performance thermoplastics from the family of the polyetherketones which can not be lithiated can be sulfinated according to the present invention.

Thus also new covalent crosslinked oligomers or polymers or polymer(blend)membranes for most different applications become accessible, for example for membrane processes like membrane fuel cells, electrodialysis (if necessary with bipolar membranes), pervaporation, gas separation, diffusion dialysis, reverse osmosis, perstraction etc.

The special advantage of the reduction process of the present invention consists in that it is possible to reduce the sulfonyl groups only partially by a lower than equimolar amount of reducing agent so that polymer or oligomers which carry both sulfinate and sulfonyl groups on the same backbone are obtained. The sulfonyl groups can be hydrolyzed acidically, alkaline and/or neutral to the respective sulfonate group in another step, so that an oligomer or polymer which contains both sulfonate and sulfinate group arises, can be converted in a further step to covalently crosslinked proton-conducting polymer membranes, whereby the sulfinate group an be crosslinked according to usual methods[1].

Another possibility for the preparation of polymeric sulfohalides, which are only partially reduced to sulfinate is made possible by the use of polymers carrying two or three different sulfohalide groups on the same polymer backbone. Particularly preferred are combinations from sulfochlorides, sulfobromides and/or sulfofluorides. Especially preferred are combinations from sulfochloride and sulfobromide group in the same polymer molecule. The ratios of the sulfohalide groups can be every arbitrary value between each other. Depending on the chosen reducing agent and the solvent used the corresponding sulfohalides show a different tendency towards reduction.

The preparation of polymers which comprise sulfohalides and sulfinate groups on the same backbone is particularly preferred as mentioned above already. Followed by a further processing to a membrane which is covalently crosslinked as it is shown exemplarily in the example 5 with the polymer PEEK. After the crosslinking the remaining sulfohalide group is alternatively hydrolyzed in water, a diluted acid and/or alkaline and transferred into the sulfonic acid or sulfonic acid salt derivative.

The ratio of sulfochloride to sulfinate group in the end product can accept every arbitrary value. It is only and alone dependent on the chosen reduction conditions. Being included a) the duration of the reduction: it is between few seconds up to 60 hours, 10 to 30 hours are preferred b) the temperature of the reduction: It is depending on medium between −60° C. and 100° C. Using sodium sulfit as a reducing agent it is between 50° C. and 100° C.

c) the solvents used: preferred are water and dipolar-aprotic solvents, particularly preferred are dipolar-aprotic polar solvents (as NMP, DMAc, DMSO and THF) and arbitrary mixtures of the solvents with each other.

While the reduction of the sulfinated oligomers and polymers according to the invention is carried out, other alkylation agents apart from the di- or oligofunctional crosslinker (for example 1.4 diiodobutane) can be added at the same time to the solution of the sulfinated polymer/oligomer in a suitable solvent, which alkylate sulfinate groups simultaneously with the cross-linking reaction. Thereby crosslinked membranes and other formed objects can be produced, whose properties are modified by the additionally introduced functional groups. If the other alkylation agents contain acidic functions, for example, a cation conductivity, particularly a proton conductivity, of the crosslinked membranes and others polymer formed object can be generated. An alkylation with alkylation agents containing basic groups leads to membranes modified with basic anion-exchange groups.

The main chains (backbones) of the polymers and oligomers of the present invention are arbitrarily chosen, however, the following polymers are preferred, as main chains:

Polyolefins like polyethylene, polypropylene, polyisobutylene, polynorbornene, Polymethylpentene, polyisoprene, poly (1.4 butadiene), poly (1.2 butadiene)

Styrene(co)polymer like polystyrene, poly(methylstyrene), poly($\alpha,\beta,\beta$-trifluorostyrene), poly (pentafluorostyrene)

perflourinated ionomers like Nafion® or the SO2Hal-precursor of Nafion® (Hal=F, Cl, Br, Dow® membrane, GoreSelect® membrane sulfonated PVDF and/or the SO2Hal-precursor, whereby Hal stands for fluorine, chlorine, bromine or iodine (Hetero) aryl main chain polymers like:

Polyetherketones polyetherketone PEK Victrex®, polyetheretherketone PEEK Victrex®, polyetheretherketoneketone PEEKK, polyetherketoneetherketoneketone PEKEKK Ultrapek®

Polyethersulfones like polysulfone Udel®, polyphenylsulfone Radel R®, Polyetherethersulfone Radel A®, polyethersulfone PES Victrex®

Poly(benz)imidazole hike PBI Celazol® and other oligomers and polymers containing the (Benz) imidazole monomer Whereby the (Benz)imidazole group can be present in the main chain or in the polymer lateral chain Polyphenyleneether like e.g. poly(2,6-dimethyloxyphenylene), poly(2,6-diphenyloxyphenylene)

Polyphenylenesulfide and copolymers

Poly (1,4-phenylene) or poly (1,3-phenylene), which can be modified in the lateral group, if necessary with benzoyl, naphtoyl or o-phenyloxy-1,4-benzoyl group, m-phenyloxy-1,4-benzoyl groups or p-phenyloxy-1,4-benzoyl groups.

Poly (benzoxazole) and copolymers

Poly (benzthiazole) and copolymers

Poly (phtalazinone) and copolymers

Polyaniline and copolymers

The reaction equations (1) and (2) show exemplary the reduction of sulfonated PEEK (polyetheretherketone) to the sulfinate:

(1)

(2)

Figure 7:
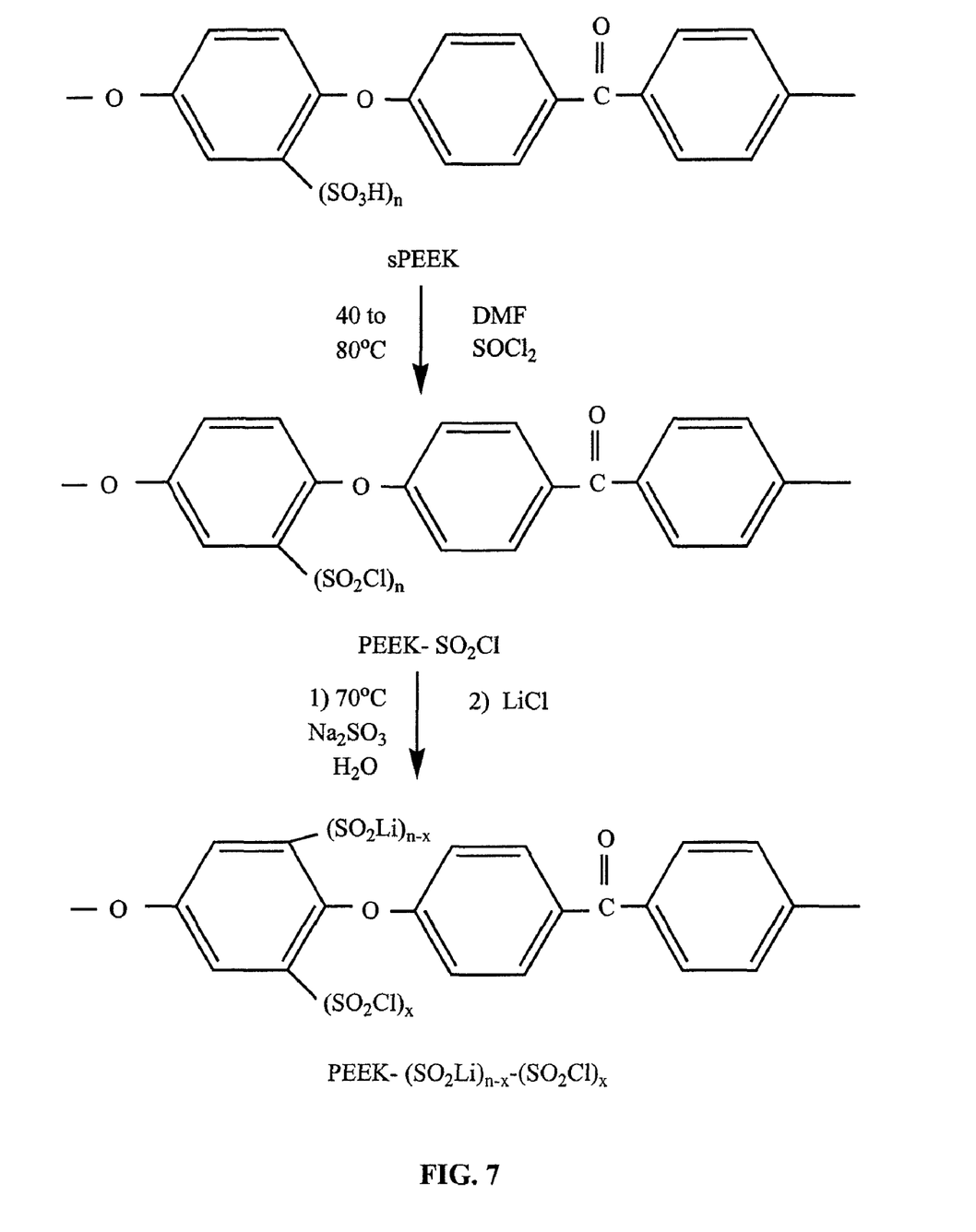
FIG. 7 shows the partial reduction of sulfonated PEEK to the corresponding sulfochloride to the sulfinate.

The partial reduction of sulfonated PEEK is exemplarily represented in the flowchart of FIG. 7 over the corresponding sulfochloride to the sulfinate.

As polymeric sulfinates are very unstable the resulting sodium salt form is transferred into the considerably more stable lithium salt by cation exchange.

According to the method of the present invention is the partial or complete reduction of sulfochlorinated polysulfone (PSU) or other poly(ethersulfone)s and sulfochlorinated PEEK or other poly(etherketone)s is quite particularly preferred.

The membranes produced by covalent crosslinking can be applied to hydrogen fuel cells, particularly in membrane fuel cells, in a temperature range of −50° C. to +280° C. depending on the main polymer backbone.

EXAMPLES

Figure 1:
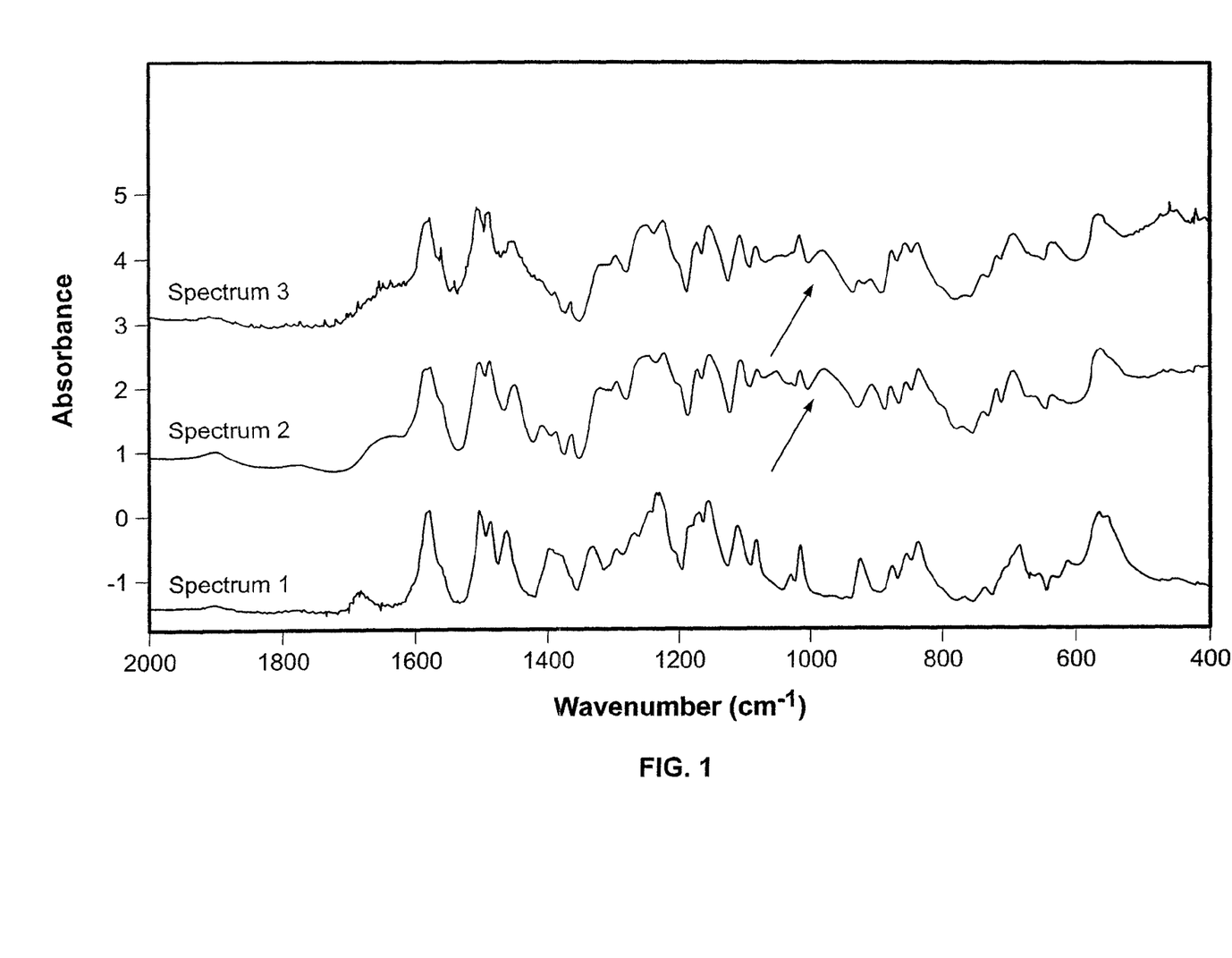
FIG. 1 shows IR spectra of the product, including a sulfinate band at 970 $cm^{-1}$; specifically, PSU—$SO_2$Cl (spectrum 1) made by reaction of PSU—Li with $SO_2$ (spectrum 2) of PSU—$SO_2$Li and made by reduction of PSU—$SO_2$Cl with $LiAlH_4$ (spectrum 3) of PSU—$SO_2$Li.

1. Preparation of a Sulfinated Polysulfone PSU Udel® by Reduction of PSU Sulfochloride with Lithiumaluminiumhydride 10.83 g sulfochlorinated PSU Udel® are dissolved in 300 ml of tetrahydrofurane (THF). The solution is cooled down under argon protective gas to −65° C. After this 13 ml of a 0.013 molar lithiumaluminiumhydride solution in THF are added within 2 hours via a dropping funnel into the polymer solution. The beginning of the reduction is indicated by hydrogen development. After the hydrogen development is finished, what is the case after about 1 hour, a mixture of 60 ml of 10 percent LiOH solution and 120 ml ethanol is injected into the reaction mixture. After this the reaction mixture is precipitated into 2.5 l iso-propanol and filtered. The residue is dried at 60° C. in the drying oven at 50 hPascal pressure. The formation of the PSU sulfinate is observed by an IR spectrum of the product. The sulfinate band at 970 cm$^{-1}$ is considerably recognizable (illus. 1, IR spectra of PSU—SO$_2$Cl (spectrum 1) made by reaction of PSU—Li with SO$_2$ (spectrum 2) of PSU—SO$_2$Li and made by reduction of PSU—SO$_2$Cl with LiAlH$_4$ (spectrum 3) of PSU—SO$_2$Li.

2. Preparation of Sulfinated Poly (Etheretherketone) PEEK by Reduction of PEEK-SO$_2$Cl with Aqueous Sodium Sulfit Solution Material:

7.6 g PEEK-SO$_2$Cl (0.02 mol)

126 g of (1 mol) Na$_2$SO$_3$ 500 ml H2O

PEEKSO$_2$Cl is added to 500 ml of a 2M Na$_2$SO$_3$ solution and is stirred at 70° C. for 20 hours. After this it is heated up to 100° C. and allowed to react for 10 min at this temperature. Then the white polymer is filtered off. The polymer is then stirred in 500 ml of a 10% LiOH solution to transform the sulfinate group into the Li form by ion-exchange. After this it is filtered and the precipitate is washed up to the neutral reaction of the washing water. After this the polymer is dried at room temperature up to weight constancy under vacuum. After this the polymer is suspended in water and dialysed. The dialysed polymer solution is dehydrated and the polymer dried at room temperature and vacuum up to the weight constancy.

Figure 2:
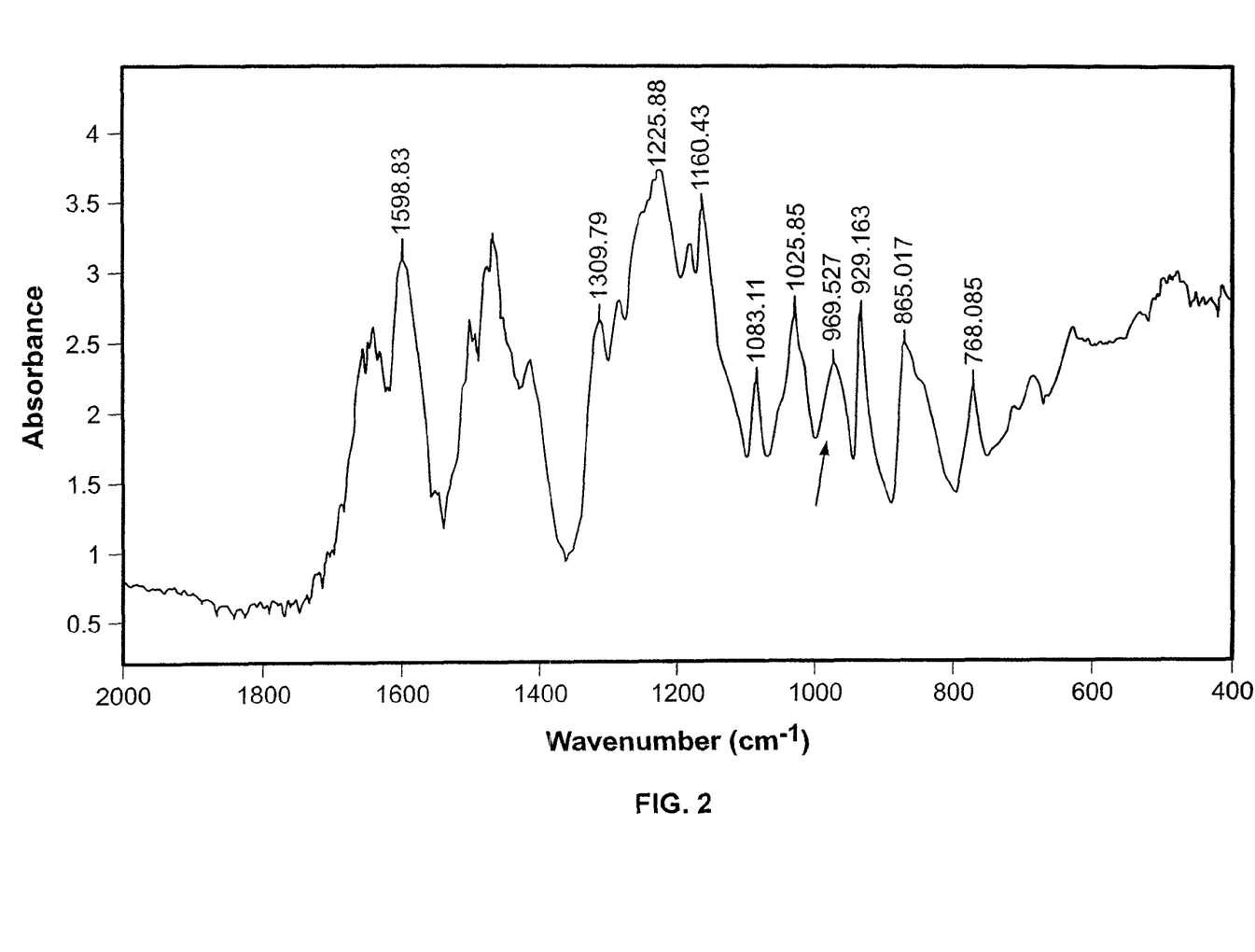
FIG. 2 is an IR spectrum showing the band of the suinate group $SO_2$Li at 970 $cm^{-1}$.
Figure 3:
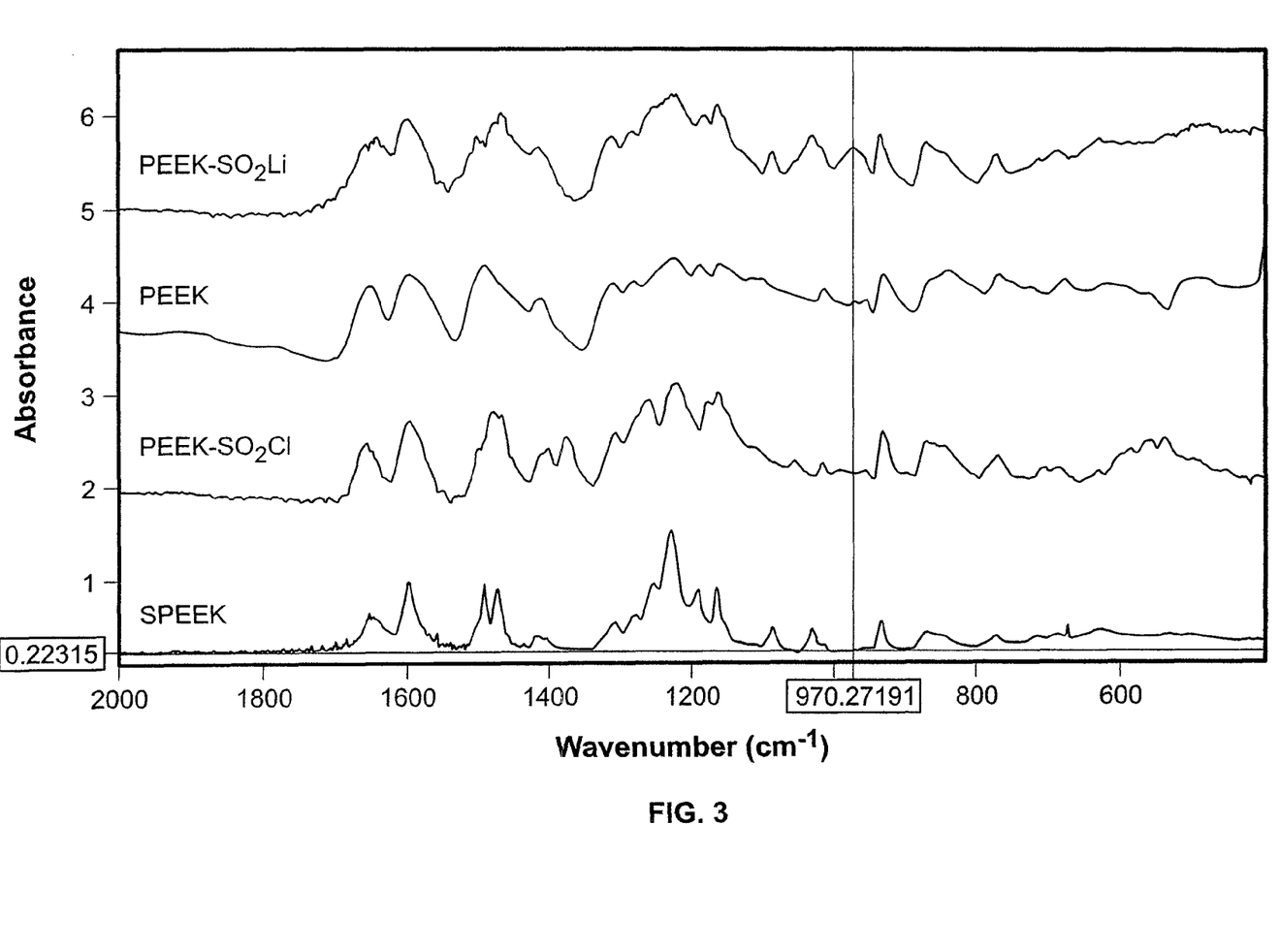
FIG. 3 shows IR spectra for .PEEK-$SO_2$Li, PEEK, PEEK-$SO_2$Cl and SPEEK.

IR: The band of the sulfinate group SO$_2$Li is detected easily at 970 cm-1 (illus. 2).

Figure 4:
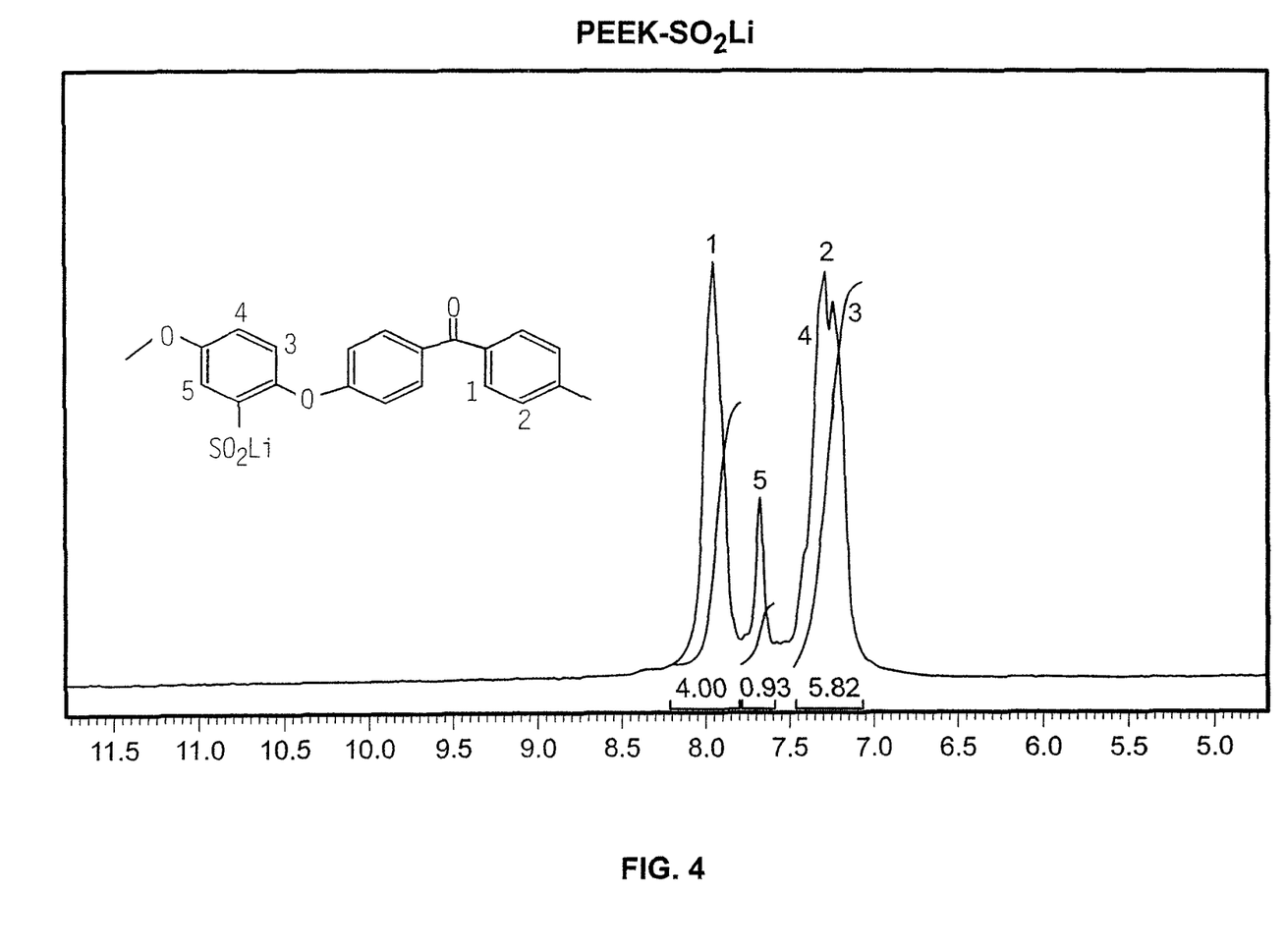
FIG. 4 shows a 1-H-NMR spectrum of the PEEK-$SO_2$Li.
Figure 5:
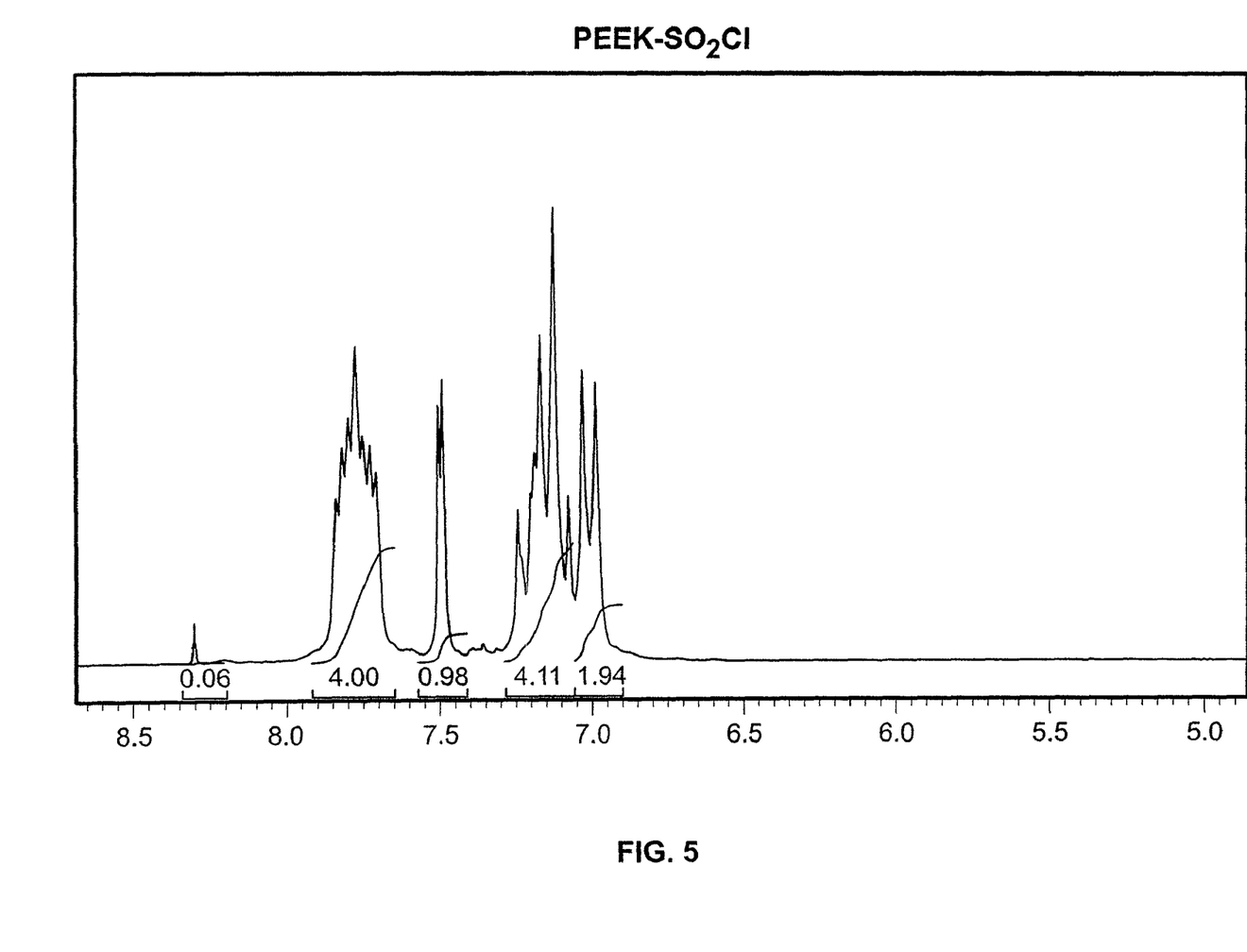
FIG. 5 shows a 1-H-NMR spectrum of the PEEK-$SO_2$Cl.

The sulfinated PEEK is easily soluble in NMP and DMSO. If 1,4-diiodobutane is given to a NMP solution of the polymer, within 5 min. a gelation takes place and with that a crosslinking of the polymer. Illus. 4 shows a 1-H-NMR spectrum of the sulfinated PEEK.

Elemental analysis: 1,0 groups replaced.

| | C | H | S | Cl |
|---|---|---|---|---|
| Theo. | 63.69 | 3.07 | 8.94 | 0 |
| Exp. | 52.52 | 3.71 | 6.60 | 1.95 |

Elemental analysis after dialysis of the product polymer (there is still Cl present in the polymer as sulfochloride):

| | C | H | S | Cl |
|---|---|---|---|---|
| Theo. | 63.69 | 3.07 | 8.94 | 0 |
| Exp. | 53.26 | 4.09 | 6.89 | 2.01 |

Elemental analysis of the starting product sulfochlorinated PEEK:

| | C | H | S | Cl |
|---|---|---|---|---|
| Theo. | 59.06 | 2.85 | 8.29 | 9.07 |
| Exp. | 57.43 | 3.07 | 8.32 | 9.54 |

Elemental analysis with calculated values if 25% of the functional groups are present as a sulfochloride and 75% of the functional groups as a sulfinate would be:

Molecular mass 397 g/mol. (C$_{19}$H$_{11}$O$_7$S$_1$Cl$_{0.25}$Li$_{0.75}$)

|       | C     | H    | S    | Cl   |
|-------|-------|------|------|------|
| Theo. | 57.31 | 2.77 | 8.06 | 2.20 |
| Exp.  | 52.52 | 3.71 | 6.60 | 1.95 |

3. Preparation of Partly Sulfinated Poly (Etheretherketone) PEEK by Reduction of PEEK-SO₂Cl with Aqueous Sodium Sulfite Solution Material:
20 g PEEK-SO$_2$Cl (0.053 mol)
300 ml of 2 molar aqueous solutions of Na$_2$SO$_3$ PEEK-SO$_2$Cl+Na$_2$SO$_3$+H$_2$O→PEEK SO$_2$Na+NaCl+NaHSO$_4$ PEEKSO$_2$Cl is added to 300 ml of a 2M Na$_2$SO$_3$ solution and is stirred at 70° C. for 20 hours. Then the white polymer is filtered off. The polymer is then stirred in 500 ml of a 10% LiOH solution to bring the sulfinate group in the Li form. After this it is filtered and the precipitate is washed up to the neutral reaction of the washing water. After this the polymer is dried at room temperature up to weight constancy under vacuum. After this the polymer is suspended in water and dialysed. The dialysed polymer solution is dehydrated and the polymer dried at room temperature and vacuum up to weight constancy.

Elemental analysis results after dialysis:

|       | C     | H    | S    | Cl   |
|-------|-------|------|------|------|
| Theo. | 63.69 | 3.07 | 8.94 | 0    |
| Exp.  | 56.21 | 4.00 | 6.75 | 2.55 |

The elemental analysis result corresponds to about 0.28 remaining sulfochloride group and 0.72 obtained sulfinate group per repeating unit. A redox titration of the sulfinated polymer with a surplus of NaOCl and back titration with sodium thiosulfate yields about 0.58 sulfinate group per repeating unit.

Data of the titration:
$C_{Na2S2O3}$=0.1N
$C_{NaOCl}$=0.4962 mmol/g
1,259 g PEEK-SO$_2$Li
11,265 g NaOCl (5.5897 mmol)
$V_{Na2S2O3}$=70,626 ml
$G_{NaOCl}$=70,626*0.1/2=3.5313 mmol
$G_{SO2Li}$=5,5897-3,5313=2.0584 mmol
40° C., 4 Stunden. 150 ml H$_2$O.
IEC$_{PEEK-SO2Li}$=2,0584/1,259=1.63 mmol/g (approximately 0.58 SO$_2$Li groups per repeating unit).

The oxidized polymer is titrated with 0.1 N NaOH. It results an IEC of 2.52 meq SO$_3$H groups per g of polymers. The starting polymer sulfonated PEEK (before sulfochloride formation) had an IEC of 2.7 meq/g.

4. Production of Partially Reduced PEEK-SO₂Cl

Material:
7.6 g PEEK-SO$_2$Cl (0.02 mol)
126 g of (1 mol) Na$_2$SO$_3$
500 ml H$_2$O PEEK-SO$_2$Cl+Na$_2$SO$_3$+H$_2$O→ClO$_2$S-PEEK-SO$_2$Na+NaCl+NaHSO$_4$ PEEKSO$_2$Cl is added to 300 ml of a 2M Na$_2$SO$_3$ solution and is stirred at 70° C. for 20 hours. Then the white polymer is filtered off. The polymer is then stirred in 500 ml of a 10% LiOH solution to bring the sulfinate group in the Li form. After this it is filtered and the precipitate is washed up to the neutral reaction of the washing water. After this the polymer is dried at room temperature up to weight constancy under vacuum. After this the polymer is suspended in water and dialysed. The dialysed polymer solution is dehydrated and the polymer dried at room temperature and vacuum up to the weight constancy. The obtained product contains both sulfinate and sulfochloride groups.

5. Preparation of Covalently Crosslinked Membranes by Using Sulfinated PEEK

The sulfinated PEEK from example 3 (0.72 sulfinate group and 0.28 sulfochloride group per repeating unit) is dissolved, if necessary together with sulfonated PEK-SO$_3$Li (for IEC$_{PEK}$=1.8 meq/g), in NMP to give a 15% solution. The crosslinker 1,4-diiodobutane is added to the solution, and a membrane is cast. The solvent is evaporated in the vacuum drying oven (first 100° C./800 hPas, then 120° C./50 hPas), and the membrane taken out of the drying oven. After cooling, it is removed under water, posttreated in 7% NaOH at 60° C. for 1 day, followed by water at 90° C. for 1 day, then in 10% H$_2$SO$_4$ at 90° C. for 1 day, and finally in water at 90° C. for 1 day.

Membrane Preparation

| Membrane [no.] | Sulfinated PEEK [g] * | Sulfonated PEK [g] ** | NMP [g] | 1,4-diiodobutane [ml] |
|---|---|---|---|---|
| PEEK 1 | 1 | 2 | 20 | 0.23 |
| PEEK 2 | 1 | 1 | 20 | 0.24 |
| PEEK 3 | 1 | — | 10 | 0.1 |

\* Sulfinated PEEK from example 3
\*\* 1.8 = meq SO$_3$Li/g of polymers sulfonated PEEK with IEC Characterization results of the membranes:

| Membrane [no.] | IECexp. [meq/g] | IECtheo [meq/g] | Water uptake [%] | Rsp [Ω*cm]* | Extraction residue [%]** |
|---|---|---|---|---|---|
| PEEK-1 | 1.61 | 1.53 | 76.2 | 4.2 | — |
| PEEK-2 | 1.4 | 1.4 | 85.9 | 5.13 | 39.4 |
| PEEK-3 | 1.01 | 1.0 | 18.1 | 22.1 | 100 |

Figure 6:
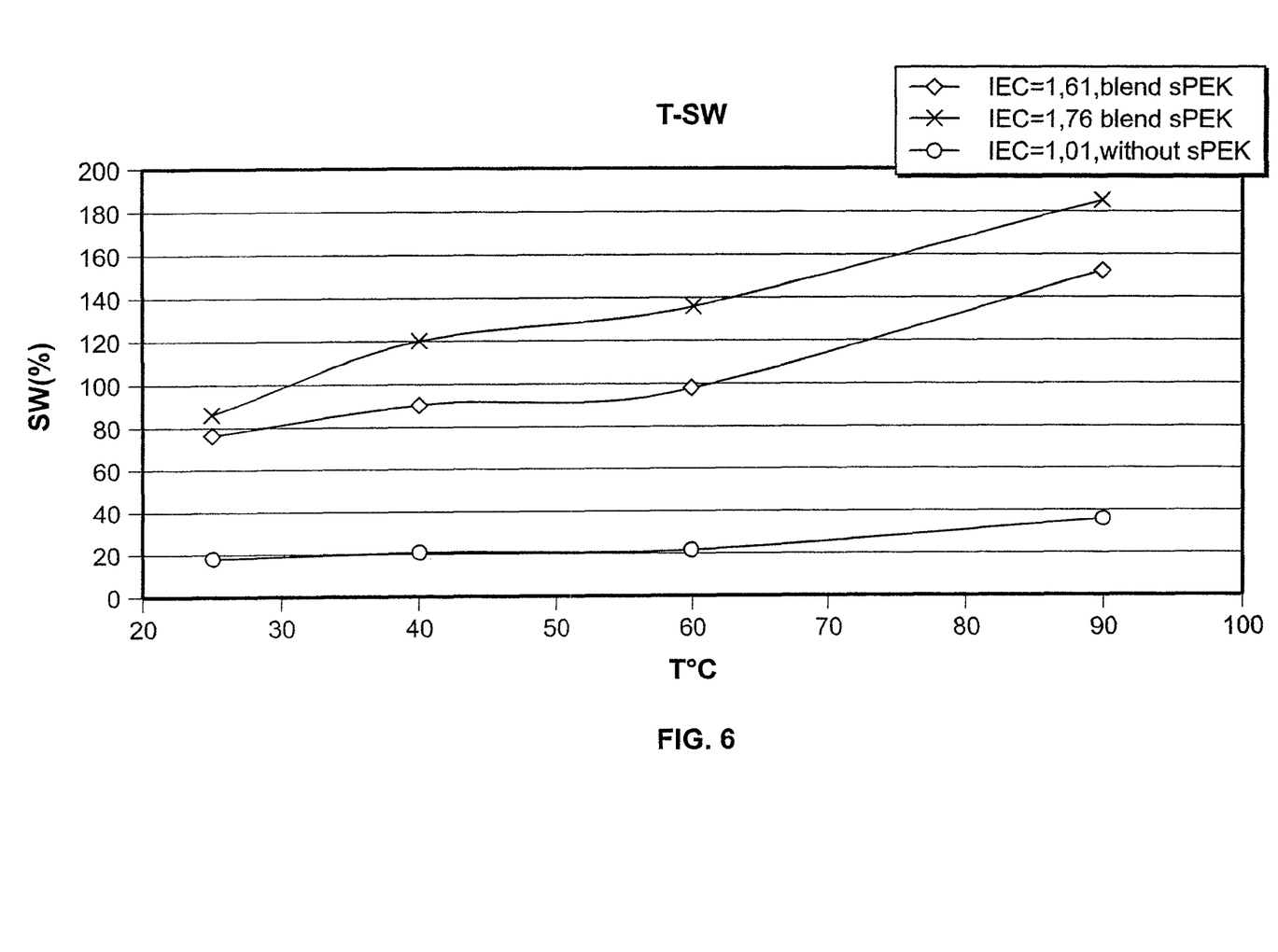
FIG. 6 shows that the swelling of a covalently cross-linked membrane from the PEEK-$SO_2$Li $SO_2$Cl.

*measured in 0.5 N HCl, impedance at room temperature (25° C.)
**stored in 90° C. hot DMAc, residue centrifuged off, washed with MeOH and water and dried in vacuum at increased temperature One sees from illus. 6, that the swelling of the covalently crosslinked membrane from PEEK-SO$_2$Li SO$_2$Cl (PEEK which contains both sulfochloride and sulfinate group) is even at a temperature of 90° C. only 33%, and this at a high proton conductivity of 22.1 Ω*cm. This is a remarkable result which lets expect for this membrane very good prospects at the application into membrane fuel cells at T>80° C.

Figure 8:
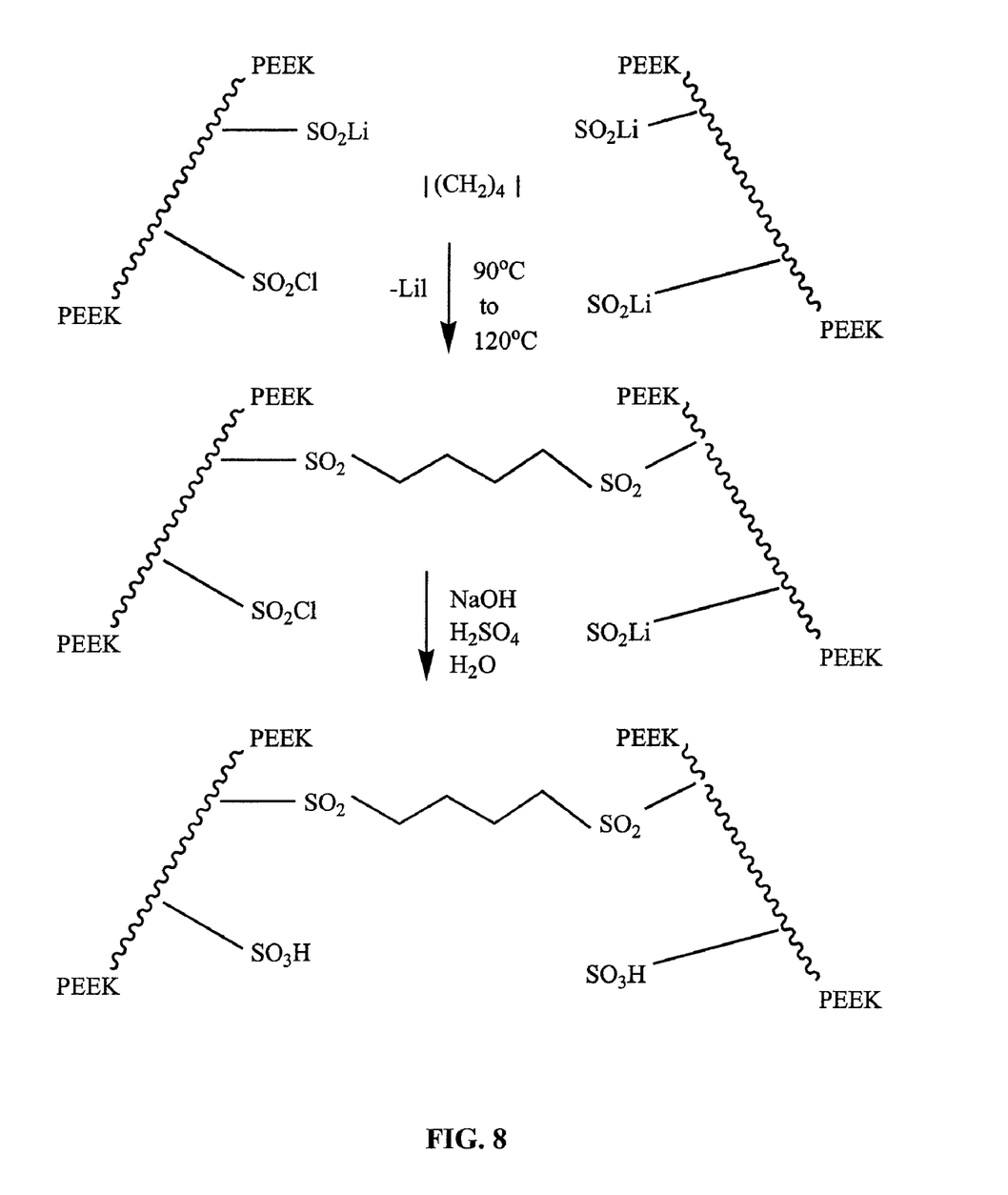
FIG. 8 shows the formation of the covalent crosslinked membrane from partially reduced PEEK-$SO_2$Cl

Following in the scheme, as shown in FIG. 8, is the formation of the covalent crosslinked membrane from partially reduced PEEK-SO$_2$Cl.

The polymers particularly preferred in the context of the invention are shown with their structures on the following pages once again. The shown polymers are substituted with sulfohalide groups prior to the reduction. The substitution degree per recurring unit is different from polymer to polymer and can reach values up to 10 sulfohalide groups per repeating unit. Values of 1 to 5, particularly of 2 to 4 sulfohalide groups are preferred. 100% of the sulfohalide groups can be reduced to sulfinate groups, however, a partial reduction of the sulfohalide groups to sulfinate groups is preferred. A value of 30 to 60% of the used sulfohalide groups is preferred.

For the preparation of covalent membranes from polymers that carry both sulfohalide and sulfochloride groups, membranes are preferred, that have an ion exchange capacity (IEC) of 0.8 to 2.2 after the hydrolysis, membranes with an IEC from 1.0 to 1.8 are particularly preferred.

The polymers with repeating units of the general formula (1) that are particularly preferred in the context of the present invention include homopolymers and copolymers, examples being random copolymers, such as ®Victrex 720 P and ®Astrel. Especially preferred polymers are polyaryl ethers, polyaryl thioethers, polysulfones, polyether ketones, polypyrroles, polythiophenes, polyazoles, phenylenes, polyphenylenevinylenes, polyanilines, polyazulenes, polycarbazoles, polypyrenes, polyindophenines and polyvinylpyridines, especially polyaryl ethers:

Ersatzblatt (Regel 26)

Polyarylethers:

Polyphenylene oxide:

(1A-1)

Polyaryl thioethers:

Polyphenylen sulfide (1B-1)

Polysulfones:

®Victrex 200 P (1C-1)

®Victrex 720 P with n > o

(1I-1)

®Radel

(1G-1)

®Radel R (1E-1)

®Victrex HTA

(1H-1)

-continued

®Victrex HTA (1H-1)

®Astrel (1I-2)

with n < o

®Udel (1F-1)

Polyether ketones:

PEK (1J-1)

PEKK (1K-1)

PEKEKK (1L-1)

PEEK (1M-1)

PEEKK (1N-1)

Polypyrroles:

(1P-1)

Polythiphenes:

(1P-2)

Polyazoles:

Polyinidazole (1S-1)

Polyphenylenes:

(1P-3)

Polyphenylenevinylene:

(1Q-1)

Polyaniline:

(1O-1)

Polyazulene:

(1P-4)

Polycarbazole:

(1P-5)

Polypyrene:

(1P-6)

Polyindophenines:

(1P-7)

Polyvinylpyridine:

(1R-1)

(1R-2)

(1R-3)

Especially preferred in accordance with the invention are crosslinked polymers with repeating units of the general formula (1A-1), (1B-1), (1C-1), (1I-1), (1G-1), (1E-1), (1H-1), (1I-1), (1F-1), (1J-1), (1K-1), (1L-1), (1M-1) and/or (1N-1).

In the context of the present invention, n designates the number of repeating units along one macromolecule chain of the crosslinked polymer. This number of the repeating units of the general formula (1) along one macromolecule chain of the crosslinked polymer is preferably an integer greater than or equal to 10, in particular greater than or equal to 100. The number of repeating units of the general formula (1A), (1B), (1C), (1D), (1E), (1F), (1G), (1H), (1I), (1J), (1K), (1L), (1M), (1N), (1O), (1P), (1Q), (1R), (1S) and/or (1T) along one macromolecule chain of the crosslinked polymer is preferably an integer greater than or equal to 10, in particular greater than or equal to 100.

In one particularly preferred embodiment of the present invention, the numerical average of the molecular weight of the macromolecule chain is greater than 25,000 g/mol, appropriately greater than 50,000 g/mol, in particular greater than 100,000 g/mol.

The invention claimed is:

1. Crosslinked polymers produced from partially sulfinated polymers or oligomers containing sulfinate and sulfohalogenide groups by addition of a crosslinker like dihalogenoalkanes or oligohalogenoalkanes or other difunctional or oligofunctional alkylation agents like compounds with tosyl groups, epoxy groups to the solutions of polymers in dipolar aprotic solvents.

2. Crosslinked polymer or polymer membrane or polymer (blend)membrane according to claim 1 characterized in that before the crosslinker is added to the solution of sulfinated polymer, still other if necessary functionalised polymers are added either dissolved or as a solid.

3. Crosslinked polymer or polymer membrane or polymer (blend)membrane according to claim 2 characterized in that the polymers added to the sulfinated polymer and sulfohalogenide containing polymer solution are selected from cation exchange polymers or their non-ionic precursors containing the cation exchange group $SO_3H$ and/or $PO_3H_2$ and/or COOH and/or non-ionic precursors of the cation exchange group like $SO_2Y$ and/or $PO_2Y_2$ or COY, where Y=F, Cl, Br, I, or $NR_2$, where R=(alkyl, aryl, H, or any combination thereof), (N imidazole) or (N pyrazole).

4. Crosslinked polymer or polymer membrane or polymer (blend)membrane according to claim 3 characterized in that to the polymer solution containing the sulfinated polymer and the sulfohalogenide groups and if necessary other polymers apart from the difunctional or oligofunctional crosslinker simultaneously still other monofunctional alkylation agents are added, which can carry, if necessary, further functional groups, which are selected from:
  acidic groups: COOM, $PO_3M_2$, $SO_3M$ with M=H or arbitrary cation;
  precursors of the acidic groups: COY, $PO_2Y_2$, $SO_2Y$; and
  basic groups like primary, secondary, tertiary amines, pyridine group, imidazole group, pyrazole group.

* * * * *